(12) United States Patent
Ishigaki

(10) Patent No.: US 10,862,305 B2
(45) Date of Patent: Dec. 8, 2020

(54) ELECTRICITY STORAGE DEVICE OUTPUT CONTROL DEVICE, OUTPUT CONTROL METHOD, POWER SYSTEM, AND COMPUTER PROGRAM

(71) Applicant: Sumitomo Electric Industries, Ltd., Osaka (JP)

(72) Inventor: Yoshihisa Ishigaki, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 29 days.

(21) Appl. No.: 15/749,184

(22) PCT Filed: Aug. 23, 2016

(86) PCT No.: PCT/JP2016/074513
§ 371 (c)(1),
(2) Date: Jan. 31, 2018

(87) PCT Pub. No.: WO2017/038559
PCT Pub. Date: Mar. 9, 2017

(65) Prior Publication Data
US 2018/0233913 A1 Aug. 16, 2018

(30) Foreign Application Priority Data
Aug. 28, 2015 (JP) .................... 2015-169519

(51) Int. Cl.
*H02J 3/00* (2006.01)
*H02J 3/32* (2006.01)
(Continued)

(52) U.S. Cl.
CPC ............ *H02J 3/32* (2013.01); *G06Q 10/06* (2013.01); *G06Q 50/06* (2013.01); *H01M 10/44* (2013.01);
(Continued)

(58) Field of Classification Search
None
See application file for complete search history.

(56) References Cited

U.S. PATENT DOCUMENTS

| 2011/0040450 A1* | 2/2011 | Izutani | B62D 5/0481 701/43 |
| 2015/0158481 A1* | 6/2015 | Tagawa | B60W 10/10 701/22 |
| 2015/0249355 A1* | 9/2015 | Takano | B60L 58/12 320/150 |

FOREIGN PATENT DOCUMENTS

| JP | 2008-178215 A | 7/2008 |
| JP | 2011-019328 A | 1/2011 |

(Continued)

*Primary Examiner* — Paul B Yanchus, III
(74) *Attorney, Agent, or Firm* — Baker Botts L.L.P.; Michael A. Sartori

(57) ABSTRACT

A device according to one mode of the present disclosure relates to a device for controlling the output of a power storage device that is chargeable and dischargeable. This output control device includes: an obtainment section configured to obtain a remaining charged power amount at a present time point of the power storage device; and a control section configured to set an operation range of the remaining charged power amount of the power storage device. The control section performs at least one of gradual decrease processes including: a first gradual decrease process in which, when the obtained remaining charged power amount is not less than a lower limit value of the operation range, a maximum discharge power of the power storage device is caused to gradually decrease over a predetermined deferment period; and a second gradual decrease process in which, when the obtained remaining charged power amount is not greater than an upper limit value of the operation (Continued)

range, a maximum charge power of the power storage device is caused to gradually decrease over a predetermined deferment period.

15 Claims, 11 Drawing Sheets

(51) Int. Cl.
    *H02J 7/00*     (2006.01)
    *H01M 10/44*     (2006.01)
    *H01M 10/48*     (2006.01)
    *G06Q 10/06*     (2012.01)
    *G06Q 50/06*     (2012.01)
    *H02J 3/38*     (2006.01)

(52) U.S. Cl.
    CPC ............... *H01M 10/48* (2013.01); *H02J 3/38* (2013.01); *H02J 7/00* (2013.01); *H02J 2007/0067* (2013.01)

(56) References Cited

FOREIGN PATENT DOCUMENTS

| JP | 2014-103831 A | 6/2014 |
|----|---------------|--------|
| JP | 2014-174735 A | 9/2014 |

\* cited by examiner

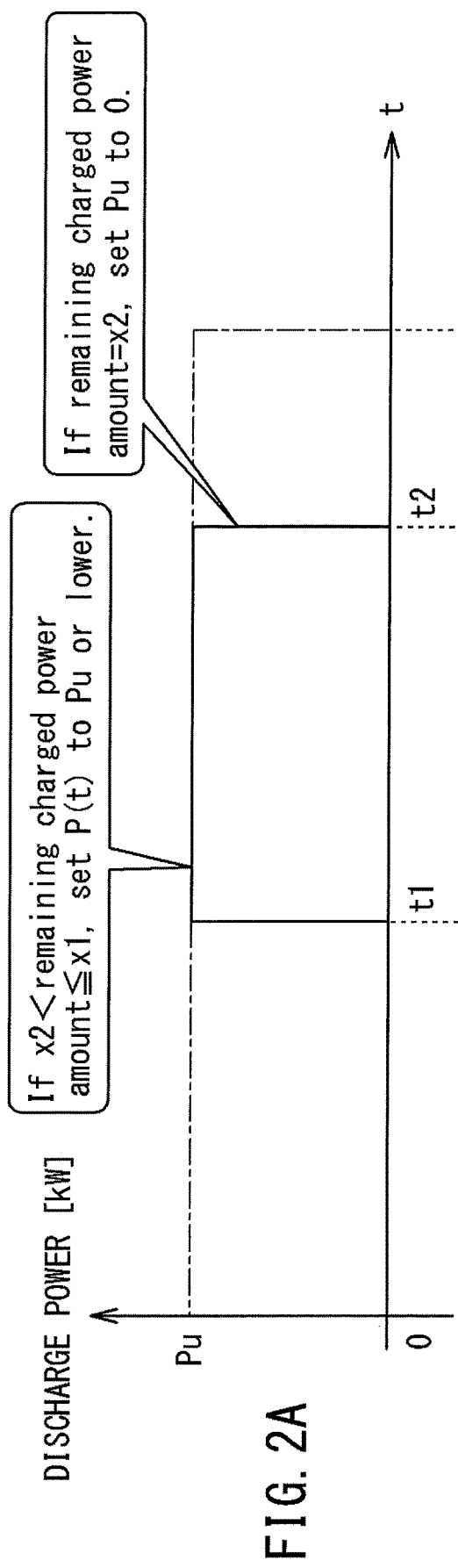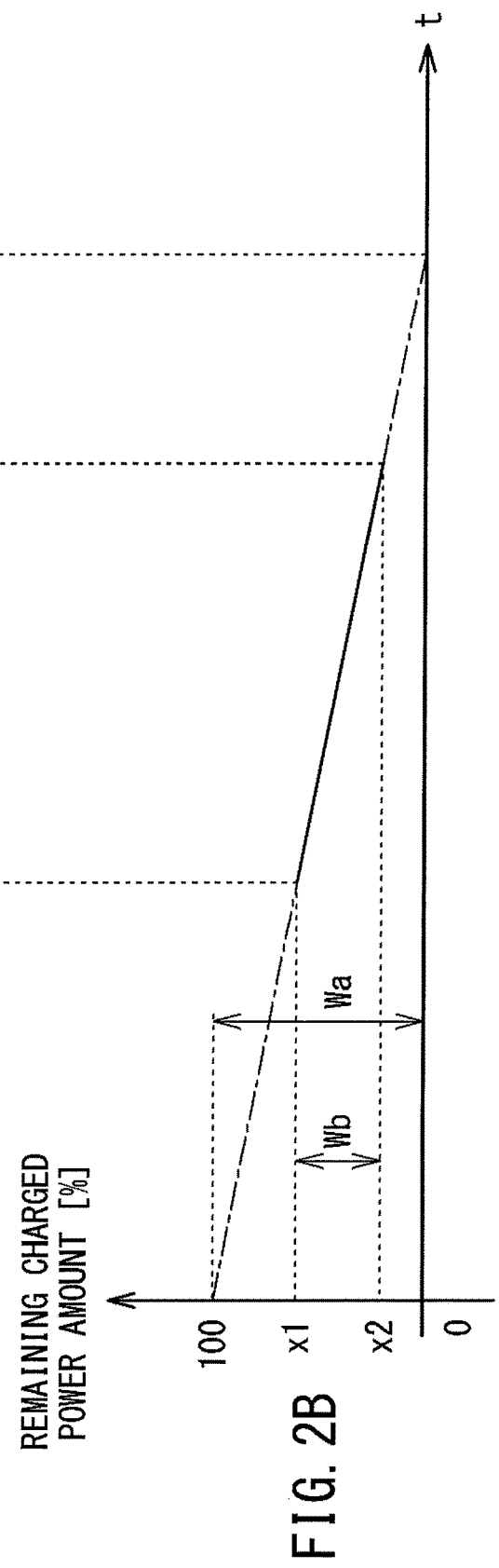
FIG. 2A
FIG. 2B

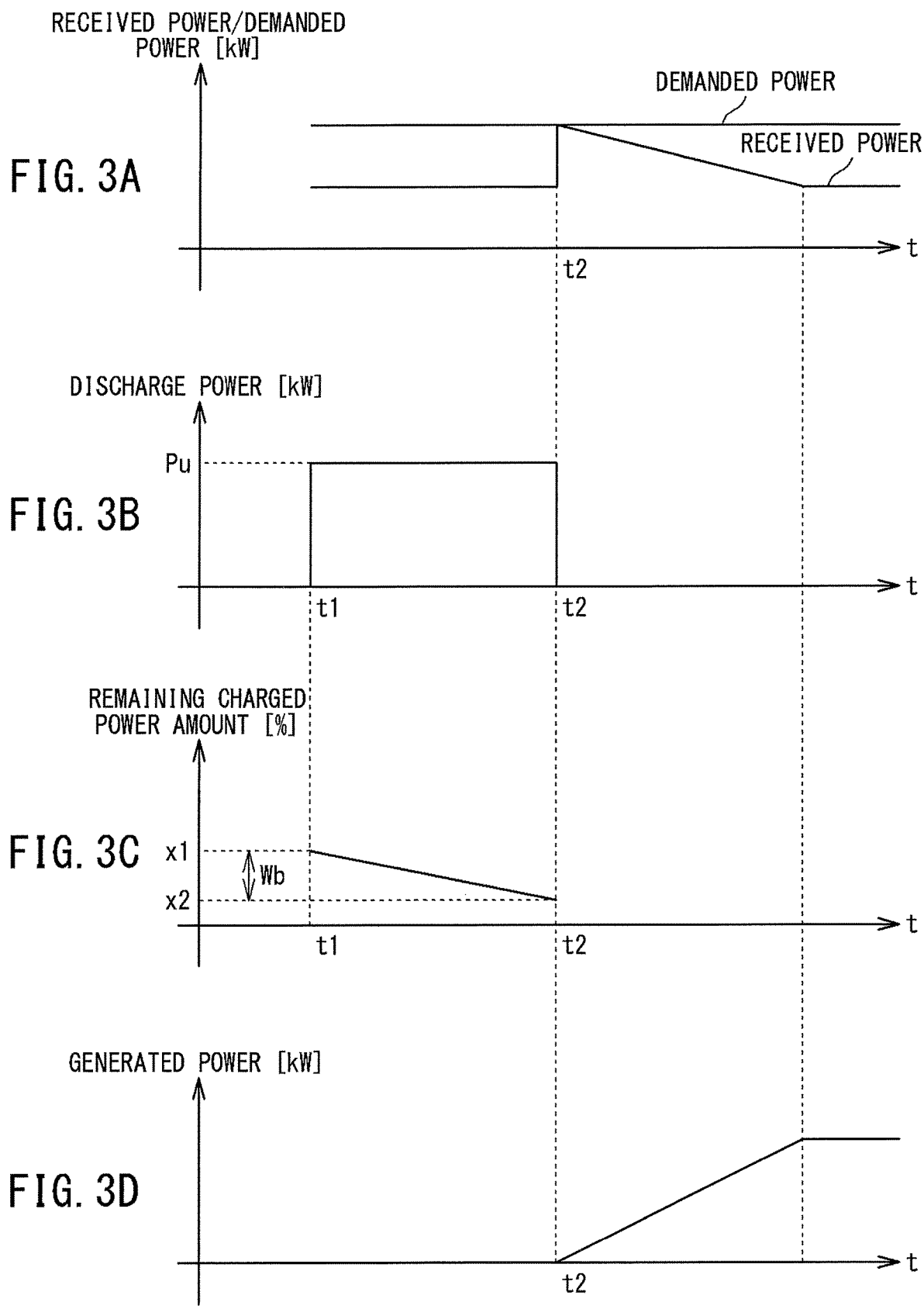

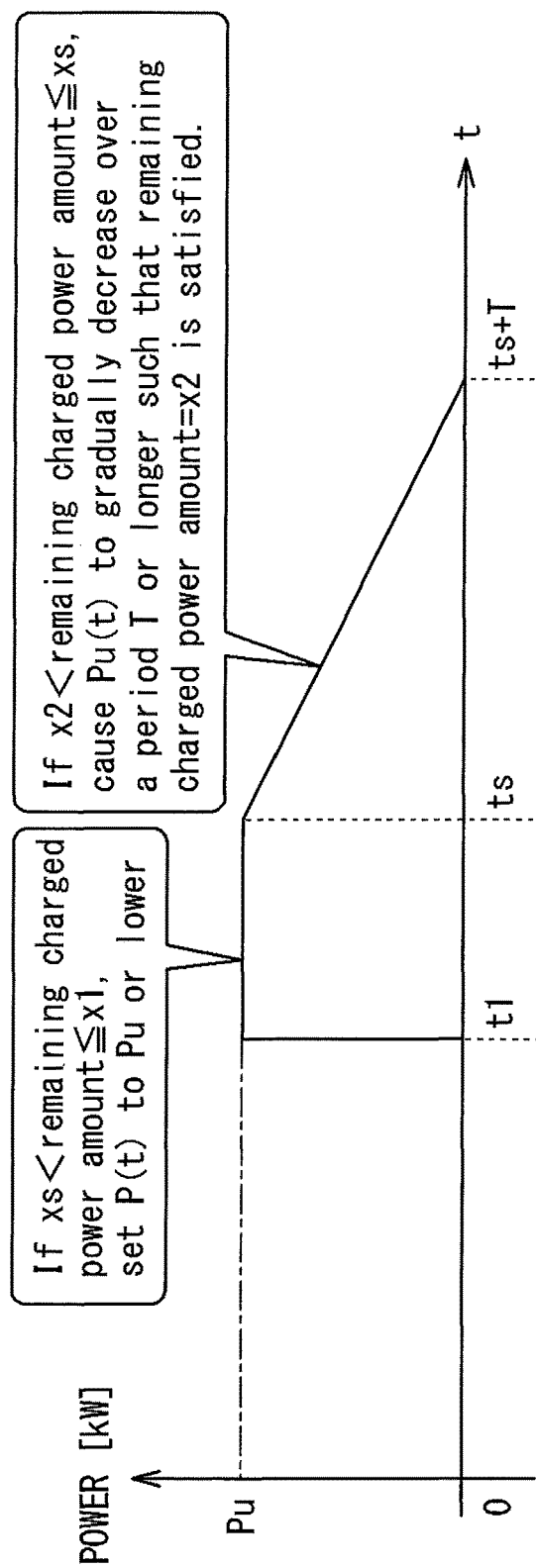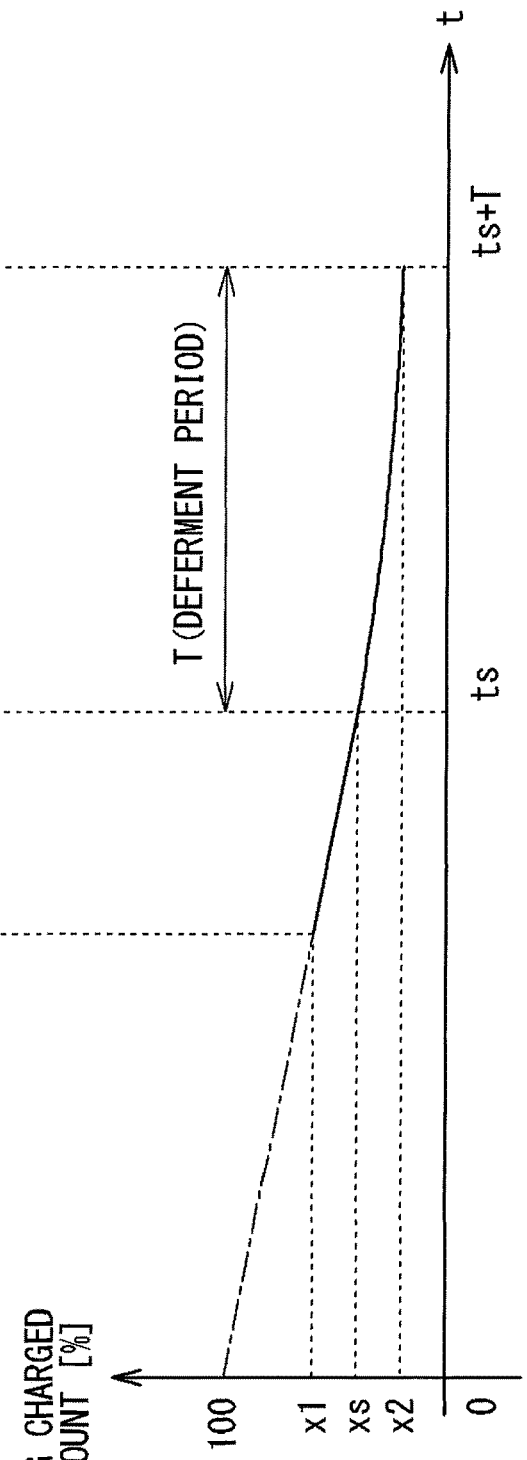

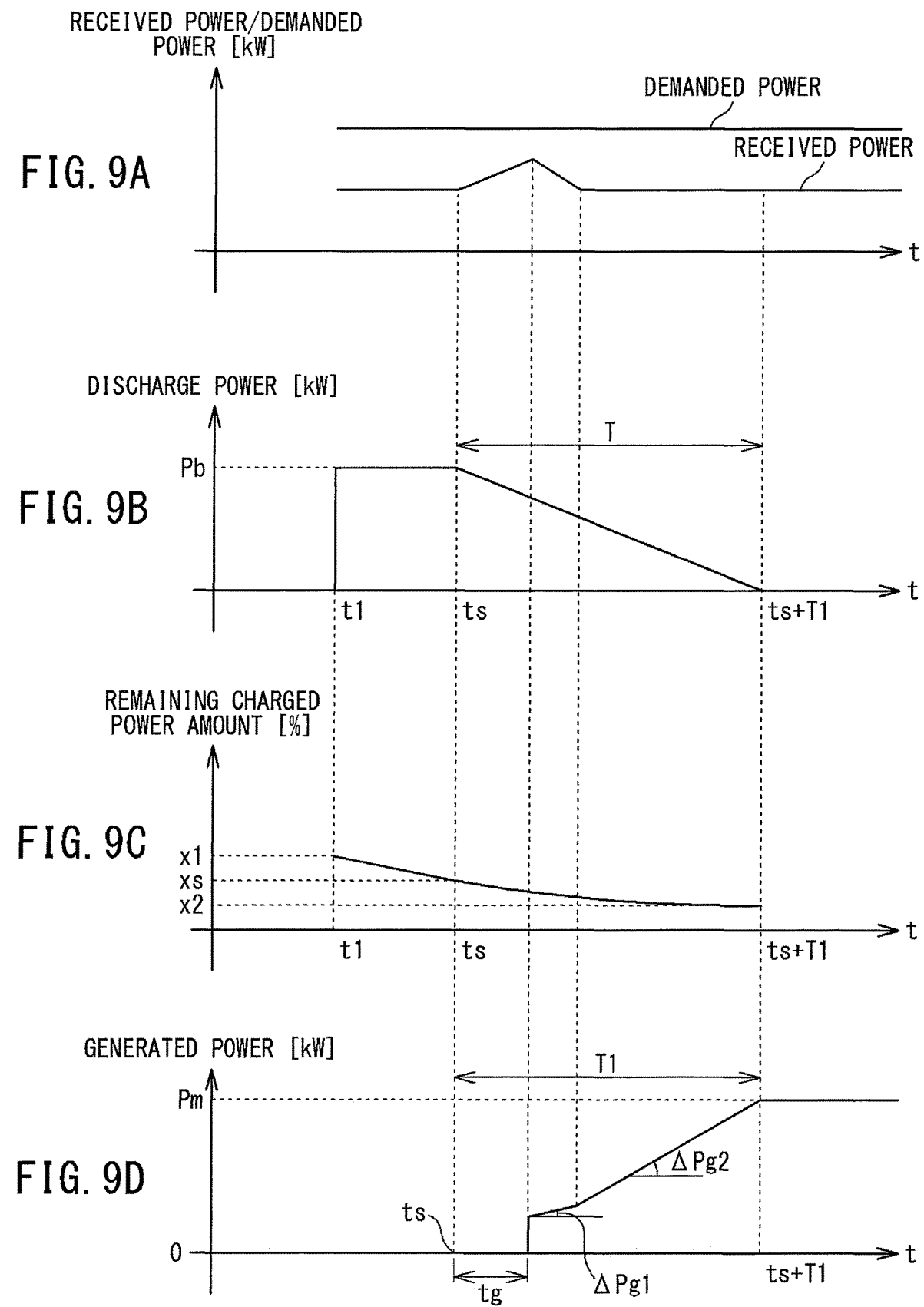

ELECTRICITY STORAGE DEVICE OUTPUT CONTROL DEVICE, OUTPUT CONTROL METHOD, POWER SYSTEM, AND COMPUTER PROGRAM

TECHNICAL FIELD

The present invention relates to an output control device for a power storage device, an output control method, a power system, and a computer program.

This application claims priority based on Japanese Patent Application No. 2015-169519 filed on Aug. 28, 2015, the entire contents of which are incorporated herein by reference.

BACKGROUND ART

An energy management system (hereinafter, referred to as "EMS") capable of causing a power storage device to operate under an advantageous charge and discharge strategy has been proposed (see PATENT LITERATURE 1).

In the EMS, for each state of a power storage device, a charge value, a discharge value, and a hold value are calculated; a cost and a remaining charged power amount are calculated with respect to all combinations of charge, discharge, and hold; and on the condition of satisfying limitations for the remaining charged power amount, a charge and discharge schedule having the minimum cost is selected, whereby an advantageous charge and discharge strategy for the power storage device is determined.

CITATION LIST

Patent Literature

PATENT LITERATURE 1: Japanese Laid-Open Patent Publication No. 2014-174735

SUMMARY OF INVENTION (1) A device according to one mode of the present disclosure is a device configured to control an output of a power storage device that is chargeable and dischargeable, the output control device including: an obtainment section configured to obtain a remaining charged power amount at a present time point of the power storage device; and a control section configured to set an operation range of the remaining charged power amount of the power storage device, wherein the control section performs at least one of gradual decrease processes including: a first gradual decrease process in which, when the obtained remaining charged power amount value is not less than a lower limit value of the operation range, a maximum discharge power of the power storage device is caused to gradually decrease over a predetermined deferment period; and a second gradual decrease process in which, when the obtained remaining charged power amount is not greater than an upper limit value of the operation range, a maximum charge power of the power storage device is caused to gradually decrease over a predetermined deferment period.

(8) Another mode of the present disclosure is a computer program configured to cause a computer to perform a process for controlling an output of a power storage device that is chargeable and dischargeable, the process including: an obtainment process in which a remaining charged power amount at a present time point of the power storage device is obtained; a setting process in which an operation range of the remaining charged power amount of the power storage device is set; and at least one of gradual decrease processes including: a first gradual decrease process in which, when the obtained remaining charged power amount is not less than a lower limit value of the operation range, a maximum discharge power of the power storage device is caused to gradually decrease over a predetermined deferment period; and a second gradual decrease process in which, when the obtained remaining charged power amount is not greater than an upper limit value of the operation range, a maximum charge power of the power storage device is caused to gradually decrease over a predetermined deferment period.

(9) Another mode of the present disclosure is an output control method for controlling an output of a power storage device that is chargeable and dischargeable, the method including: a step of obtaining a remaining charged power amount at a present time point of the power storage device; a step of setting an operation range of the remaining charged power amount of the power storage device; and a step of performing at least one of gradual decrease processes including: a first gradual decrease process in which, when the obtained remaining charged power amount is not less than a lower limit value of the operation range, a maximum discharge power of the power storage device is caused to gradually decrease over a predetermined deferment period; and a second gradual decrease process in which, when the obtained remaining charged power amount is not greater than an upper limit value of the operation range, a maximum charge power of the power storage device is caused to gradually decrease over a predetermined deferment period.

BRIEF DESCRIPTION OF DRAWINGS

FIG. 2 shows graphs illustrating one example of temporal change in discharge power (FIG. 2A) and remaining charged power amount (FIG. 2B) of a power storage device, which are obtained when an EMS server performs conventional output control on the power storage device.

FIG. 3 shows graphs illustrating one example of temporal change in received power/demanded power (FIG. 3A), discharge power (FIG. 3B) and remaining charged power amount (FIG. 3C) of the power storage device, and generated power (FIG. 3D) of a power generation device, which are obtained when the EMS server performs conventional output control on the power storage device.

FIG. 4 shows graphs showing temporal change in discharge power (FIG. 4A) and remaining charged power amount (FIG. 4B) of the power storage device, which are obtained when the EMS server performs output control according to the present embodiment on the power storage device.

FIG. 9 shows graphs showing temporal change in received power/demanded power (FIG. 9A), discharge power (FIG. 9B) and remaining charged power amount (FIG. 9C) of the power storage device, and generated power (FIG. 9D) of the power generation device, which are obtained when the EMS server performs the output control according to the present embodiment by use of a first deferment period.

DESCRIPTION OF EMBODIMENTS

Figure 1:
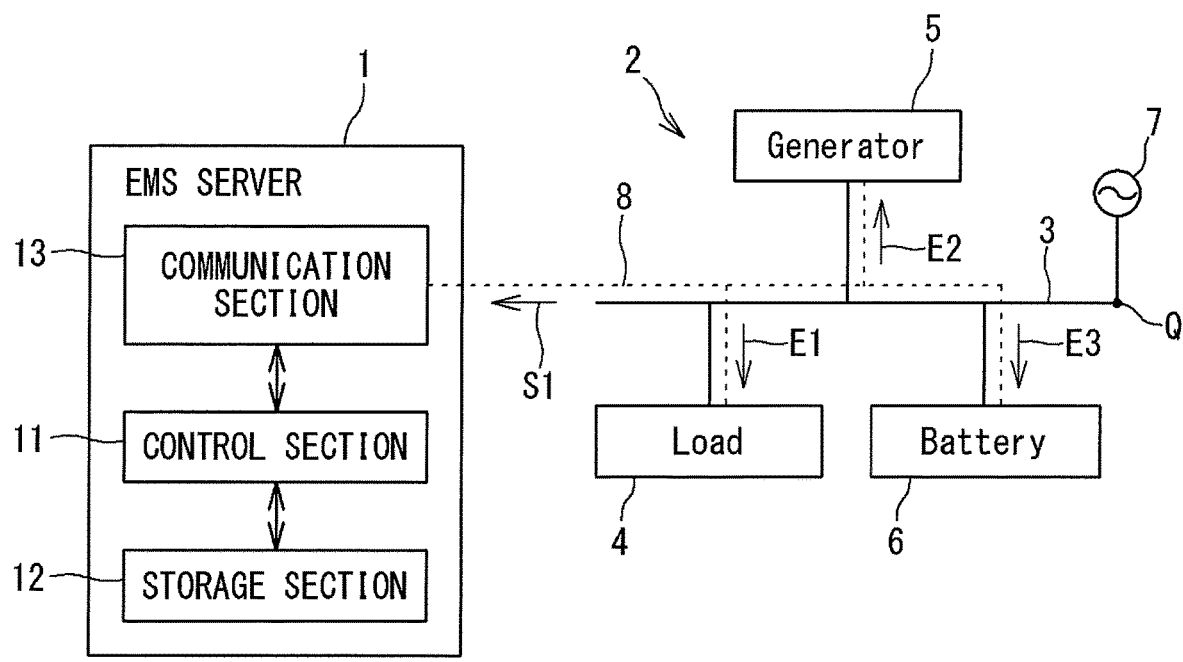
FIG. 1 is a block diagram showing a configuration example of a power system according to an embodiment of the present invention.

Problems to be Solved by the Present Disclosure

In an EMS, conceivable elements that play roles of balancing the power demand and supply in power equipment to be managed are, in general, system power, a power generation device, a power storage device, and a load device.

Among these, the load device corresponds to power consumption by the demander, and thus, in an environment where the power generation device is present, performing control of the load device is not desirable. The power generation device has a feature that the power generation device is slow in activation and output power response but the amount of power that can be outputted is infinite as long as the primary fuel is supplied. The power storage device has a feature that the power storage device is quick in activation and output power response but the discharge power that can be outputted is limited due to limitation of the remaining charged power amount as described in PATENT LITERATURE 1.

In consideration of the above features, as demand and supply control for power equipment including a power storage device and a power generation device, the power storage device responds first when the demand has greatly varied, and then, the power generation device responds, to satisfy the demand, in some cases.

That is, the above-described method is a control method in which, the power for the delay time until the output of the power generation device increases or decreases or until the power generation device is activated or stopped is compensated by charge/discharge power of the power storage device.

However, in a conventional EMS, usually, while the remaining charged power amount at the present time point is within the upper and lower limit values of a predetermined operation range, a charge/discharge output command value for the power storage device is set to an arbitrary value not greater than a constant limit value that has been set. Then, when the remaining charged power amount at the present time point reaches the lower limit value of the operation range, the maximum discharge power of the power storage device is set to zero, and when the remaining charged power amount reaches the upper limit value of the operation range, the maximum charge power of the power storage device is set to zero.

Thus, the charge/discharge power of the power storage device suddenly changes before and after the time at which the remaining charged power amount takes the upper or lower limit value, and thus, there are cases where the power generation device, which is slow in response, cannot satisfy the demand, and the balance of power demand and supply in the power equipment cannot be maintained.

In consideration of such conventional problems, an object of the present disclosure is to prevent disturbance in the balance of power demand and supply in power equipment in a case where the power demand and supply in the power equipment including a power storage device are controlled.

Effect of the Present Disclosure

According to the present disclosure, when power demand and supply in power equipment including a power storage device are to be controlled, disturbance in the balance of power demand and supply in the power equipment can be prevented.

Outline of Embodiment of the Present Invention

In the following, the outlines of the embodiment of the present invention are listed and described.

(1) An output control device of the present embodiment is a device configured to control an output of a power storage device that is chargeable and dischargeable, the output control device including: an obtainment section configured to obtain a remaining charged power amount at a present time point of the power storage device; and a control section configured to set an operation range of the remaining charged power amount of the power storage device, wherein the control section performs at least one of gradual decrease processes including: a first gradual decrease process in which, when the obtained remaining charged power amount is not less than a lower limit value of the operation range, a maximum discharge power of the power storage device is caused to gradually decrease over a predetermined deferment period; and a second gradual decrease process in which, when the obtained remaining charged power amount is not greater than an upper limit value of the operation range, a maximum charge power of the power storage device is caused to gradually decrease over a predetermined deferment period.

According to the output control device of the present embodiment, by the control section performing the first gradual decrease process described above, it is possible to prevent in advance, when discharging of the power storage device is to be ended, a situation in which the discharge power instantaneously decreases from the maximum discharge power value, which is set to be constant, to zero. In addition, according to the output control device of the present embodiment, by the control section performing the second gradual decrease process described above, it is possible to prevent in advance, when charging of the power storage device is to be ended, a situation in which the charge power instantaneously decreases from the maximum charge power value, which is set to be constant, to zero.

Thus, when power demand and supply in the power equipment including the power storage device are to be controlled, disturbance in the balance of power demand and supply in the power equipment can be prevented.

(2) In the output control device of the present embodiment, the deferment period may be set to be, for example, a time period in which an output of the power generation device reaches a maximum output, from 0.

(3) In the output control device of the present embodiment, the deferment period may be set to be a time period in which an output of a power generation device reaches a maximum output, from a steady output thereof.

(4) In the output control device of the present embodiment, the deferment period may be set to be a time period in which an output of a power generation device increases by a steady output of the power storage device.

(5) In the output control device of the present embodiment, the gradual decrease process is, for example, a process in which at least one of the maximum discharge power and the maximum charge power is caused to gradually decrease in an exponential manner in accordance with a lapse of time.

(6) In the output control device of the present embodiment, the gradual decrease process may be a process in which at least one of the maximum discharge power and the maximum charge power is caused to gradually decrease in a linear manner in accordance with a lapse of time.

(7) A power system of the present embodiment is a power system including: power equipment including a power storage device that is chargeable and dischargeable, and another power device to be subjected to power control; an EMS (energy management system) server capable of performing power control that balances power demand and supply in the power equipment, wherein the power storage device or the EMS server is provided with the output control device described above.

Thus, the power system of the present embodiment exhibits effects similar to those of the output control device described above.

(8) A computer program of the present embodiment relates to a program configured to cause a computer to perform a process performed by the output control device described above.

Thus, the computer program of the present embodiment exhibits effects similar to those of the output control device described above.

(9) An output control method of the present embodiment relates to an output control method performed by the output control device described above.

Thus, the energy management method of the present embodiment exhibits effects similar to those of the output control device described above.

The present invention can be realized not only as the output control device provided with the characteristic control section as described above, but also as a program configured to cause a computer to perform steps of the processes performed by the control section.

In addition, the present invention can be realized as a semiconductor integrated circuit realizing a part or all of the output control device, can be realized as a system including the output control device, or can be realized as a recording medium which temporarily stores the program described above.

Details of Embodiments of the Present Invention

Hereinafter, details of embodiments of the present invention are described with reference to the drawings. At least parts of the embodiments described below may be combined to each other as desired.

[Overall Configuration of System]

FIG. 1 is a block diagram showing a configuration example of a power system according to an embodiment of the present invention.

As shown in FIG. 1, a power system of the present embodiment includes: an EMS server 1; and power equipment 2 to be managed by the EMS server 1. The EMS server 1 manages operation states of various types of power devices included in the power equipment 2.

The EMS server 1 of the present embodiment is implemented as an FEMS (factory energy management system) server, for example. Thus, the power equipment 2 includes: a distribution network implemented as a distribution line 3 wired in a factory; and a load device 4, a power generation device 5, and a power storage device 6 which are connected to the distribution line 3.

The load device 4 includes, for example, a non-adjustment-type load device, such as a production machine, of which power adjustment is not possible or actually not allowed even if possible. The load device 4 may include an adjustment type load device, such as a light or an air conditioner, of which power consumption is adjustable.

The load device 4 is connected to the distribution line 3 through a device, such as a smart tap (not shown) or a smart distribution board, which is capable of performing control and measurement of power information, for example.

The power generation device 5 includes, for example, a power generation device that converts, into electric energy, combustion energy of gas, diesel oil, or the like, or energy resultant from chemical change in a fuel battery or the like.

The power storage device 6 includes at least one of a redox-flow (RF) battery, a lithium ion battery, a molten-salt battery, and a lead storage battery, for example.

In the power equipment 2 of the present embodiment, the distribution line 3 is connected to a commercial power source 7 through a measurement device such as a smart meter. Thus, in the power equipment 2, system interconnection with the commercial power source 7 is allowed.

The EMS server 1 is connected to various types of power devices of the power equipment 2 through a communication line 8, and forms a wired LAN (local area network) with the various types of power devices. The communication between the EMS server 1 and the power devices may be in the form of wireless communication such as a wireless LAN.

The EMS server 1 can transmit a plurality of kinds of control commands E1 to E3, to communicable power devices included in the power equipment 2. The EMS server 1 can receive present information S1 indicating an operation status of the power equipment 2, from each communicable power device included in the power equipment 2.

The control command E1 is a control command relating to control of the load device 4. For example, the EMS server 1 can turn on or off, by means of the control command E1, a smart tap to which the load device 4 is connected.

By transmitting the control command E1 to a load device 4 of which power consumption is adjustable, the EMS server 1 can adjust the power consumption of the load device 4.

The control command E2 is a control command relating to control of the power generation device 5. For example, the EMS server 1 can turn on or off the power generation device 5 by means of the control command E2.

By transmitting the control command E2 to a power generation device 5 of which power generation amount is adjustable, the EMS server 1 can also adjust the power generation amount of the power generation device 5.

The control command E3 is a control command relating to control of the power storage device 6. For example, the EMS server 1 can turn on or off the power storage device 6 by means of the control command E3.

The EMS server 1 can also adjust, by means of the control command E3, at least one of charge power and discharge power of a power storage device 6 that is being connected to the distribution line 3.

The EMS server 1 collects, every predetermined time period (for example, 1 second), a connection status (on/off) of each of the various types of converters and smart taps in the power equipment 2, and the present information S1 including an operation status, a power value, and the like of each of the devices 4 to 6.

The present information S1 obtained by the EMS server 1 includes a value of the remaining charged power amount of the power storage device 6 at the present time point.

The remaining charged power amount at the present time point can be calculated by any of a table reference method, a current integration method, and a combination of these.

The table reference method is a method in which a remaining charged power amount corresponding to an open circuit voltage estimated from the terminal voltage of a battery cell is obtained from a reference table stored in advance. The current integration method is a method in which the current flowing in a battery cell is integrated for each very short time period, thereby calculating the remaining charged power amount.

The remaining charged power amount at the present time point may be autonomously calculated by the power storage device 6 to be informed to the EMS server 1, or may be calculated by the EMS server 1.

In the former case, the power storage device 6 transmits, as the present information S1, the value of the remaining charged power amount calculated by the power storage device 6, to the EMS server 1, and a communication section 13 (see FIG. 1) of the EMS server 1 receives the transmitted value of the remaining charged power amount. Thus, in this case, the communication section 13 of the EMS server 1 serves as an obtainment section for obtaining the remaining charged power amount at the present time point.

In the latter case, it is sufficient that the power storage device 6 transmits, as the present information S1, the voltage value and the current value of a battery cell at the present time point, to the EMS server 1, and a control section 11 (see FIG. 1) of the EMS server 1 calculates a value of the remaining charged power amount on the basis of the received voltage value and the received current value.

Thus, in this case, the control section 11 of the EMS server 1 serves as an obtainment section for obtaining the remaining charged power amount at the present time point.

[Configuration of EMS Server]

As shown in FIG. 1, the EMS server 1 is implemented as a computer device including the control section 11, a storage section 12, and the communication section 13.

The control section 11 is implemented as an information processor including a CPU (central processing unit). The storage section 12 has: a memory including a RAM (random access memory); and a mass storage section implemented as an HDD (hard disk drive) or the like.

Although not shown in FIG. 1, the EMS server 1 has connected thereto: an input device including a mouse, a keyboard, and the like with which an administrator of the power equipment 2 performs an operation input; and a display device implemented as a liquid crystal display or the like for presenting, to the administrator, image data outputted by the control section 11.

The communication section 13 is implemented as a wired or wireless communication device communicable with various types of power equipment included in the power equipment 2, through a wired LAN, a wireless LAN, or another communication method.

The control section 11 reads out and executes a computer program stored in the storage section 12, thereby performing various types of control such as communication control with respect to the communication section 13, input/output control with respect to the input device and the display device, and energy management for the power equipment 2 to be managed.

On the basis of the communication control by the control section 11, the communication section 13 transmits the control commands E1 to E3 to communicable power devices included in the power equipment 2, receives the present information S1 indicating the operation status of the power equipment 2 from each of the power devices, and transfers the received present information S1 to the control section 11.

For energy management with respect to the power equipment 2, the control section 11 controls the operation state of each of the load device 4, the power generation device 5, and the power storage device 6 included in the power equipment 2 such that the power demand and supply at a power receiving point Q (see FIG. 1) of the commercial power source 7 are in a desired state.

The reason for this is that, for example, if a 30-minute average value of received power exceeds a predetermined target power (≤contracted demand) due to a great variation of the received power (instantaneous value), a penalty is imposed by the power company.

Thus, the control section 11 calculates power demand at the present time point in the power equipment 2 on the basis of the collected various types of present information S1.

The power demand at the present time point in the power equipment 2 can be calculated by totaling the received power at the present time point (for example, a measurement value by a smart meter), and the generated power at the present time point by the power generation device 5. The power demand at the present time point in the power equipment 2 can be calculated also by totaling the power consumption at the present time point of the load devices 4.

[Conventional Output Control for Power Storage Device]

FIG. 2 is a diagram describing conventional output control for the power storage device 6 performed by the EMS server 1.

Specifically, FIG. 2 shows graphs illustrating one example of temporal change in discharge power (FIG. 2A) and remaining charged power amount (FIG. 2B) of the power storage device 6, which are obtained when the EMS server 1 performs conventional output control on the power storage device 6.

In FIG. 2, "Pu" is an upper limit value of discharge power that can be outputted by the power storage device 6. Hereinafter, "Pu" is also referred to as "maximum discharge power". "P(t)" is an output command value for discharge power determined by the EMS server 1 at a time t.

"Wa" is a range of the remaining charged power amount in which the power storage device 6 can be used safely (hereinafter, referred to as "usable range Wa"). Here, the upper limit value of the usable range Wa of the remaining charged power amount is set to be 100%, and the lower limit value thereof is set to be 0%. However, the usable range Wa is narrower than the maximum range of the remaining charged power amount obtained from physical properties of the battery cell.

"Wb" is an operation range (hereinafter, referred to as "operation range Wb") of the remaining charged power amount set as desired by the user of the power storage device 6. Here, the upper limit value of the operation range Wb of the remaining charged power amount is set to be x1%, and the lower limit value thereof is set to be x2%.

"t1" is the time at which the power storage device 6 starts discharging in a state where the remaining charged power amount is at the upper limit value x1 (full charge in the operation range Wb). "t2" is the time at which the power storage device 6 ends discharging in a state where the remaining charged power amount is at the lower limit value x2 (empty state in the operation range Wb).

Usually, the operation range Wb of the power storage device 6 is set to be not greater than the usable range Wa. That is, the setting is made so as to satisfy Wb≤Wa.

In a case where the operation state of the power storage device 6 is "charge", the control section 11 of the EMS server 1 terminates the charging when the value of the remaining charged power amount at the present time point becomes x1%.

In a case where the operation state of the power storage device 6 is "discharge", the control section 11 of the EMS server 1 terminates the discharging when the value of the remaining charged power amount at the present time point becomes x2%.

Conventionally, if x2<the remaining charged power amount≤x1 is satisfied while the power storage device 6 is in discharge, the control section 11 of the EMS server 1 sets the output command value P(t) for the power storage device 6 to the upper limit value Pu or lower. When the remaining charged power amount=x2 is satisfied, the control section 11 sets the upper limit value Pu of the power storage device 6 to zero.

Thus, in the conventional output control for the power storage device 6 performed by the EMS server 1, while the remaining charged power amount does not reach the lower limit value x2 of the operation range Wb, an arbitrary value of the discharge power from zero to the upper limit value Pu is commanded to the power storage device 6, and no particular limitation is imposed on the discharge power of the power storage device 6.

[Problem of Conventional Output Control]

FIG. 3 shows graphs illustrating one example of temporal change in received power/demanded power (FIG. 3A), discharge power (FIG. 3B) and remaining charged power amount (FIG. 3C) of the power storage device 6, and generated power (FIG. 3D) of the power generation device 5, which are obtained when the EMS server 1 performs conventional output control on the power storage device 6.

The example shown in FIG. 3 assumes a case in which: in an environment where the power storage device 6 is in operation in order to satisfy the power demand at the power equipment 2, since the remaining charged power amount has decreased to reach x2, the power generation device 5 is caused to operate, thereby satisfying the demand and supply.

However, conventionally, in a case where x2<the remaining charged power amount≤x1 is satisfied, the output range of the output command value P(t) for the power storage device 6 is set to the upper limit value (maximum discharge power) Pu, and at the moment when the remaining charged power amount=x2 is satisfied, the upper limit value Pu is set to zero. Therefore, before and after a time t2 when the remaining charged power amount=x2 is satisfied, the discharge power of the power storage device 6 instantaneously (for example, in 1 millisecond to several seconds) decreases from an arbitrary value not greater than the upper limit value Pu, to zero.

Meanwhile, as shown in FIG. 3D, even when the power generation device 5 starts activating at the time t2, if the response of the power generation device 5 is slow, generated power that is enough to satisfy the demand is not immediately outputted.

Thus, as shown in FIG. 3A, from the time t2 at which the remaining charged power amount=x2 is satisfied, the demand and supply balance at the power receiving point Q is no longer maintained at an intended state, and for example, if this state continues for a long time, there is a possibility that the 30-minute average value of the received power exceeds a predetermined target power (≤contracted demand).

FIG. 3 shows an example in which the power generation device 5 is activated at the time t2 when the remaining charged power amount=x2 is satisfied. However, even when the power generation device 5 has already been activated at the time t2, if the response speed of the power generation device 5 is slow, there are cases where the power generation device 5 cannot follow the demand.

Thus, in the present embodiment, in a case where the power storage device 6 is in discharge, output control is performed in which the output command value P(t) for the power storage device 6 is caused to gradually decrease such that the discharge power smoothly converges "over a predetermined deferment period", whereby the above-described problem is solved.

It should be noted that "to converge over a predetermined deferment period" includes not only a case where the discharge power becomes zero at the end time point of the deferment period, but also a case where the discharge power becomes zero at the time point slightly after the end time point of the deferment period.

In the following, details of the output control according to the present embodiment performed on the power storage device 6 by the EMS server 1 are described with reference to FIG. 4 and FIG. 5. In FIG. 4 and FIG. 5, reference signs (such as Pu) that are same as those in FIG. 2 and FIG. 3 have the same meaning as in FIG. 2 and FIG. 3.

[Output Control According to the Present Embodiment for Power Storage Device]

FIG. 4 is a diagram describing output control according to the present embodiment for the power storage device 6 performed by the EMS server 1.

Specifically, FIG. 4 shows graphs illustrating one example of temporal change in discharge power (FIG. 4A) and remaining charged power amount (FIG. 4B) of the power storage device 6, which are obtained when the EMS server 1 performs the output control according to the present embodiment on the power storage device 6.

In FIG. 4, a "gradual decrease process" is a process in which, in a case where the operation state of the power storage device 6 is "discharge", and if x2<the remaining charged power amount≤xs is satisfied, the upper limit value Pu of the power storage device 6 is caused to gradually decrease, so as to be dependent on the remaining charged power amount. The upper limit value of the power storage device 6 calculated through the gradual decrease process is expressed as a time function Pu(t). In a case where P(t)=Pu(t) is assumed to have continued from a start time ts, the upper limit value Pu(t) is adjusted such that the output command value P(t) for the power storage device 6 becomes zero or very small after a lapse of a predetermined deferment period T.

"xs" is an initial value of the remaining charged power amount at which the gradual decrease process is started among intermediate values of the remaining charged power amount included in the use range Wb.

"ts" is the time at which the remaining charged power amount takes the initial value xs. Thus, the time ts is also the start time of the gradual decrease process. "T" is the deferment period in which, in a case where the output of P(t)=Pu(t) expressed by use of the upper limit value Pu(t) of the discharge power of the power storage device 6 is assumed to have continued, the output is caused to converge to zero or a very small value. The deferment period is set as several seconds to several tens of minutes, for example.

As shown in FIG. 4, in a case where the operation state of the power storage device 6 is, for example, "discharge", and if xs<the remaining charged power amount≤x1 is satisfied, the control section 11 of the EMS server 1 sets the output command value P(t) for the power storage device 6 to the upper limit value Pu or lower.

Accordingly, in the period from the start time t1 of discharge in the full charge state until the start time ts of the gradual decrease process, the upper limit value of the power storage device 6 is Pu.

In a case where the operation state of the power storage device 6 is "discharge", and if x2<the remaining charged power amount≤xs is satisfied, the control section 11 of the EMS server 1 uses the gradual decrease process, and performs adjustment such that, in a case where P(t)=Pu(t) is assumed to have continued from the start time ts, the output command value P(t) for the power storage device 6 becomes zero or very small after a lapse of the predetermined deferment period T.

Accordingly, in the deferment period T which starts at the start time ts of the gradual decrease process, the output command value P(t) for the power storage device 6 does not suddenly change, but gradually converges toward zero.

[Effect of Output Control According to the Present Embodiment]

FIG. 5 shows graphs illustrating one example of temporal change in received power/demanded power (FIG. 5A), discharge power (FIG. 5B) and remaining charged power amount (FIG. 5C) of the power storage device 6, and generated power (FIG. 5D) of the power generation device 5, which are obtained when the EMS server 1 performs the output control according to the present embodiment on the power storage device 6.

The example shown in FIG. 5 also assumes an environment where, in order to satisfy the power demand at the power equipment 2, the power storage device 6 is in operation and the power generation device 5 is stopped.

Figure 5A:
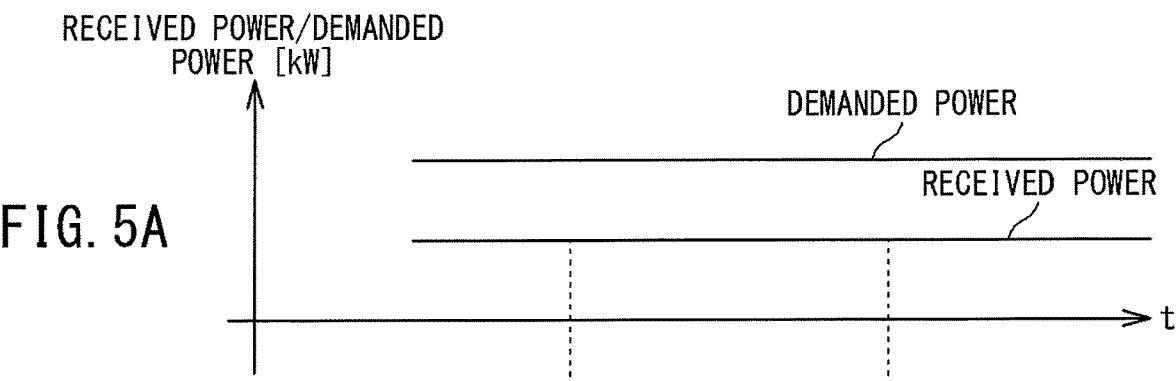
FIG. 5 shows graphs showing temporal change in received power/demanded power (FIG. 5A), discharge power (FIG. 5B) and remaining charged power amount (FIG. 5C) of the power storage device, and generated power (FIG. 5D) of the power generation device, which are obtained when the EMS server performs the output control according to the present embodiment on the power storage device.
Figure 5B:
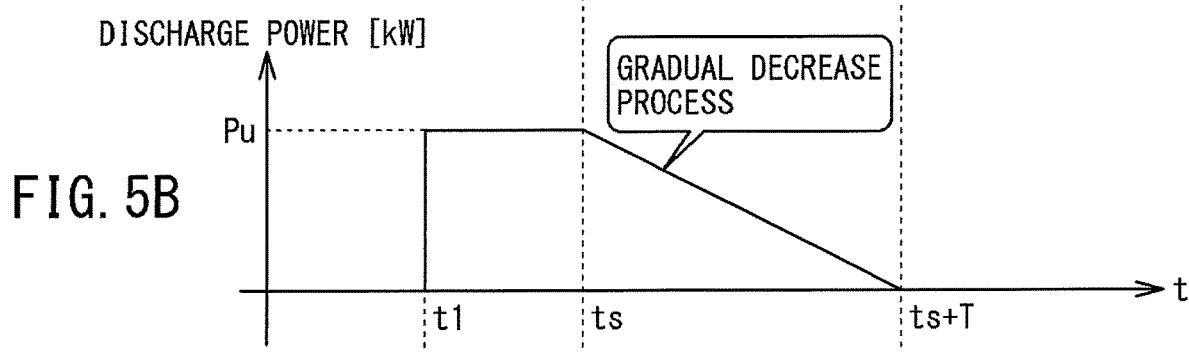
Figure 5C:
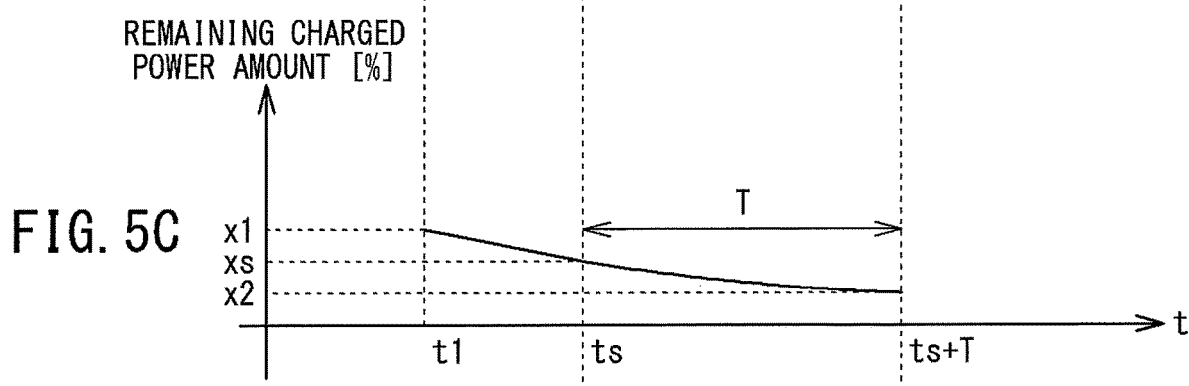
Figure 5D:
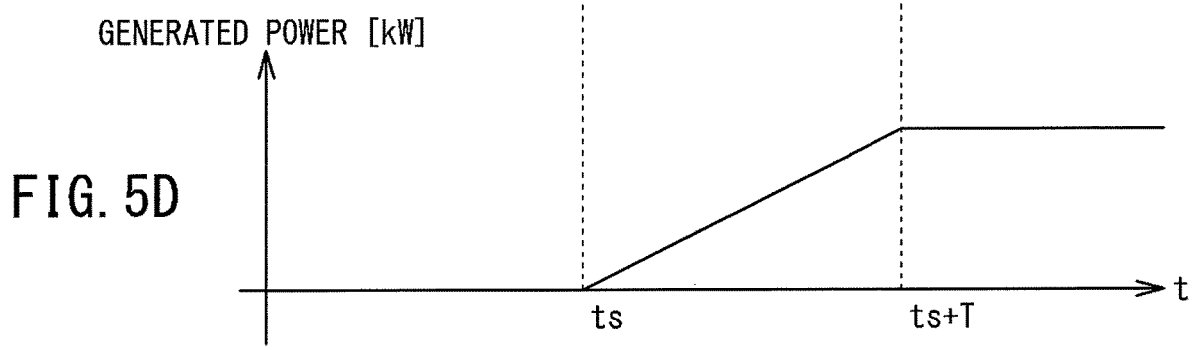

As described above, the EMS server 1 of the present embodiment performs the gradual decrease process in which, when the remaining charged power amount takes the predetermined initial value xs while the power storage device 6 is in discharge, the upper limit power Pu of the discharge power is caused to gradually decrease so as to realize an output change that is not greater than a value set in advance (see FIG. 5B and FIG. 5C).

Therefore, different from the conventional output control (FIG. 2 and FIG. 3), when discharging of the power storage device 6 is to be ended, a situation in which the discharge power instantaneously decreases from the upper limit value Pu to zero can be prevented in advance.

Thus, the received power increases by an amount corresponding to the decrease in the output from the power storage device 6, and thus, the start of output of the power generation device 5 can be determined. Since the power storage device 6 gradually decreases the output therefrom over a time period that allows the power generation device 5 to provide sufficient output, variation in received power associated with sudden decrease of the discharge power can be suppressed, as shown in FIG. 5A, and disturbance in the balance of power demand and supply at the power receiving point Q is avoided.

Example 1 of Method for Calculating Output Command Value

FIG. 6 is a diagram describing one example of a method for calculating the upper limit value Pu(t) of the discharge power in the gradual decrease process. Definitions of variables and constants in FIG. 6 are as follows. In FIG. 6, SOC (State Of Charge) denotes "remaining charged power amount", and the unit thereof is not [%] but the amount of power [kWh].

P(t): output command value (kW) at present time point

Pu(t): upper limit value (kW) of discharge power in the gradual decrease process x(t): remaining charged power amount (kWh) at present time point xs: initial value of remaining charged power amount (kWh) at which the gradual decrease process is started xe: target value of remaining charged power amount (kWh) in the gradual decrease process (for example, the amount of power corresponding to the lower limit value x2(%) in FIG. 4)

ts: start time of the gradual decrease process te: end time (=ts+T) of the gradual decrease process α: target multiplying factor set in advance (for example, α=0.01)

T: deferment period (seconds)

Figure 6A:
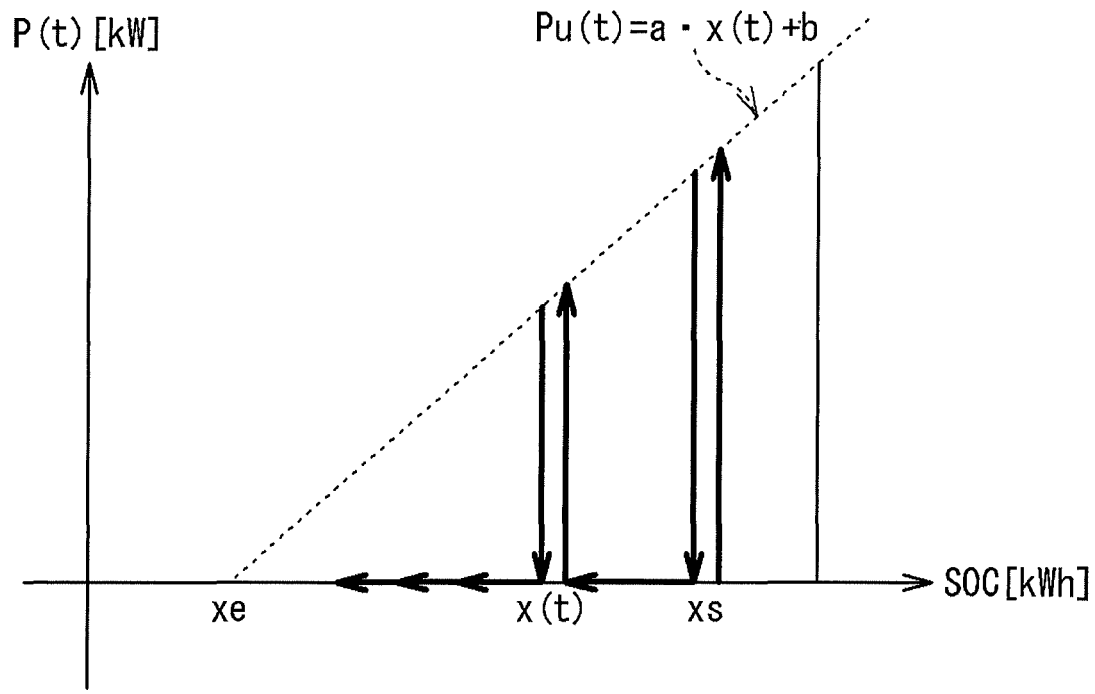
FIG. 6A is a diagram describing one example of a method for calculating output command in a gradual decrease process.

As shown in FIG. 6A, in a rectangular coordinate system in which the horizontal axis represents the remaining charged power amount (SOC) and the vertical axis represents the output command value P(t), a linear function of Pu(t)=a·x(t)+b is defined.

As the operation, the upper limit value Pu(t) for each operation cycle Tc included in the deferment period T is calculated by the following formula, such that the upper limit value Pu (te) after a lapse of T seconds from the present time point converges to a value a-times the upper limit value Pu (ts) at the present time point.

$$Pu(t) = \left(1 - \alpha^{\frac{Tc}{T}}\right)(x(t) - x_e)\frac{3600}{Tc} \quad \text{[Math. 1]}$$

In the calculation formula above, T is the deferment period (seconds). Tc is a control cycle (seconds).

When the calculation formula described above is expressed by use of coefficients of the above-described linear function, the following formulae are obtained.

$$P_u(t) = ax(t) + b \quad \text{[Math. 2]}$$

$$a = \left(1 - \alpha^{\frac{Tc}{T}}\right)\frac{3600}{Tc}, \quad b = \left(1 - \alpha^{\frac{Tc}{T}}\right)\frac{3600}{Tc}(-x_e)$$

Figure 6B:
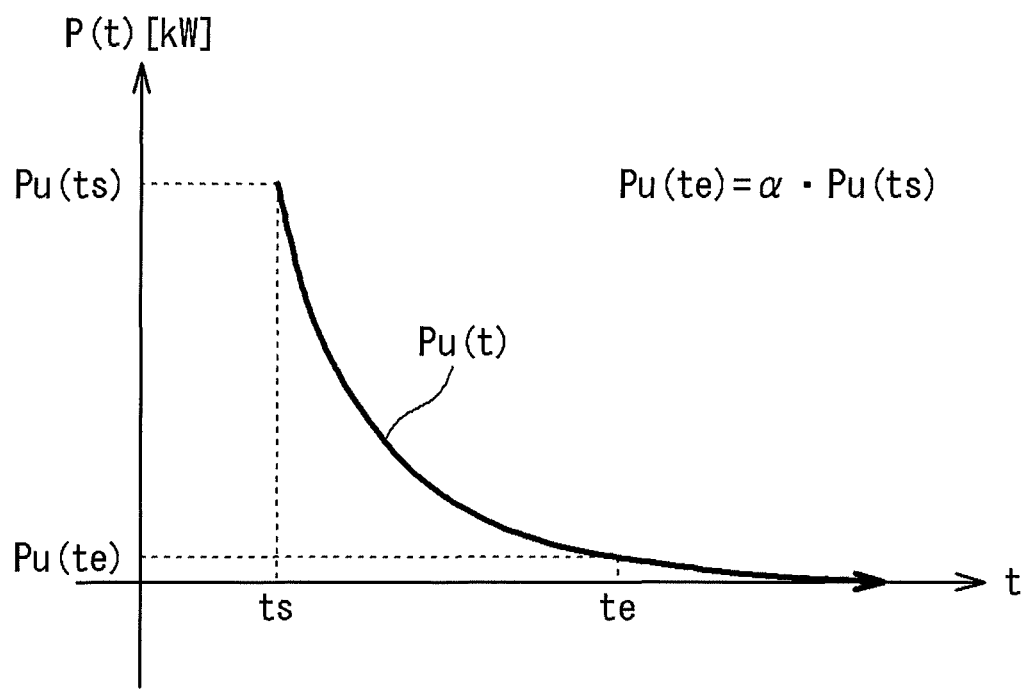
FIG. 6B is a graph showing one example of temporal change in output command value.

FIG. 6B is a graph showing one example of temporal change in the upper limit value Pu(t) obtained when the state of output command value P(t)=upper limit value Pu(t) has continued. As shown in FIG. 6B, the upper limit value Pu(t) at each time point calculated by the above calculation formula forms a shape in which the upper limit value Pu(t) exponentially decays from the start time is of the gradual decrease process.

It should be noted that the calculation method of the upper limit value Pu(t) shown in FIG. 6 is one example, and another calculation method may be employed, such as defining the relationship between Pu(t) and the remaining charged power amount by means other than a linear function.

Example 2 of Method for Calculating Output Command Value

FIG. 7 is a diagram describing another example of the method for calculating the upper limit value Pu(t) of the discharge power in the gradual decrease process. The definitions of variables and constants in FIG. 7 are as follows. Also in FIG. 7, SOC is "remaining charged power amount", and the unit thereof is not [%] but the amount of power [kWh].

P(t): output command value (kW) at present time point

Pu(t): upper limit value (kW) of discharge power in the gradual decrease process x(t): remaining charged power amount (kWh) at present time point xs: initial value of remaining charged power amount (kWh) at which the gradual decrease process is started xe: target value of remaining charged power amount (kWh) in the gradual decrease process (for example, the amount of power corresponding to the lower limit value x2(%) in FIG. 4)

ts: start time of the gradual decrease process te: end time (=ts+T) of the gradual decrease process Pu: maximum discharge power (set value) of the power storage device a: slope used when upper limit value Pu(t) of discharge power is caused to gradually decrease in a linear manner T: deferment period (seconds)

FIG. 6 describes an example of a calculation method used when the upper limit value Pu(t) of the discharge power is caused to gradually decrease in an exponential manner in accordance with a lapse of time. Meanwhile, FIG. 7 describes an example of a calculation method used when the upper limit value Pu(t) of the discharge power is caused to gradually decrease in a linear manner in accordance with a lapse of time.

Here, the unit of the slope "a" when the upper limit value Pu(t) of the discharge power is caused to gradually decrease in a linear manner is defined as (kW/s). At this time, when the slope "a" is used, Pu(t) is expressed as Pu(t)=Pu−a(t−ts), and when the deferment period T is used, Pu(t) is expressed as Pu(t)=Pu(1−(t−ts)/T). Either the slope "a" or the deferment period T serves as a setting parameter.

When the slope "a" is used as the setting parameter, it is sufficient to employ, as the value of the slope "a", a value that is equal to the response speed of the power generation device 5 which is slow in response and which is to be cooperated with the power storage device 6.

When the deferment period T is used as the setting parameter, it is sufficient to simply employ, as the deferment period T, a predetermined time value that suppresses the upper limit value Pu(t).

Figure 7A:
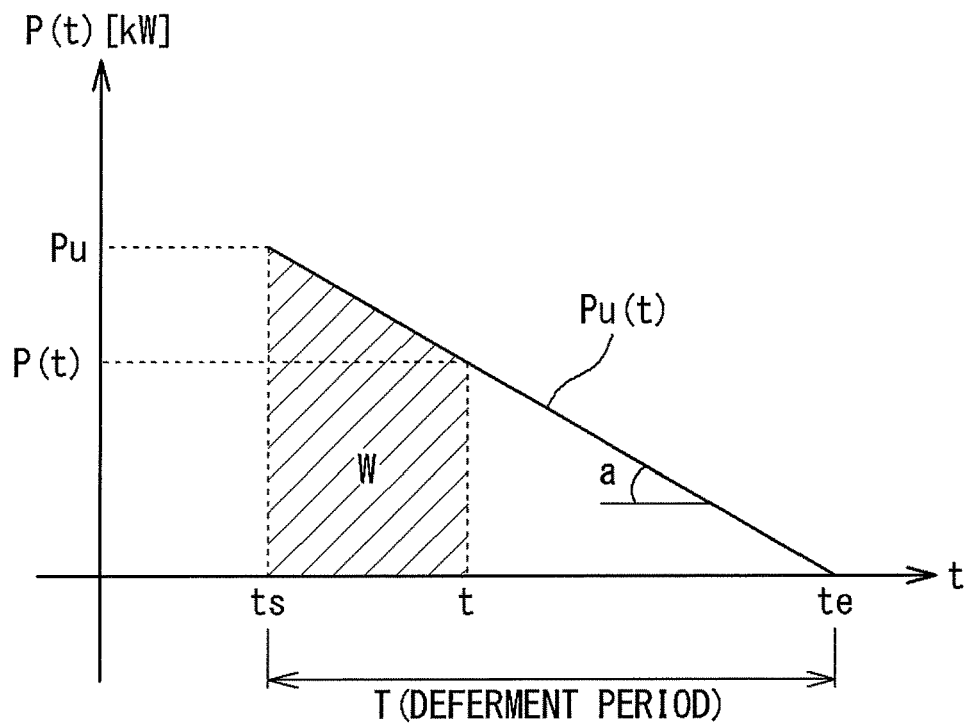
FIG. 7A and FIG. 7B are each a diagram describing another example of a method for calculating output command in the gradual decrease process.
Figure 7B:
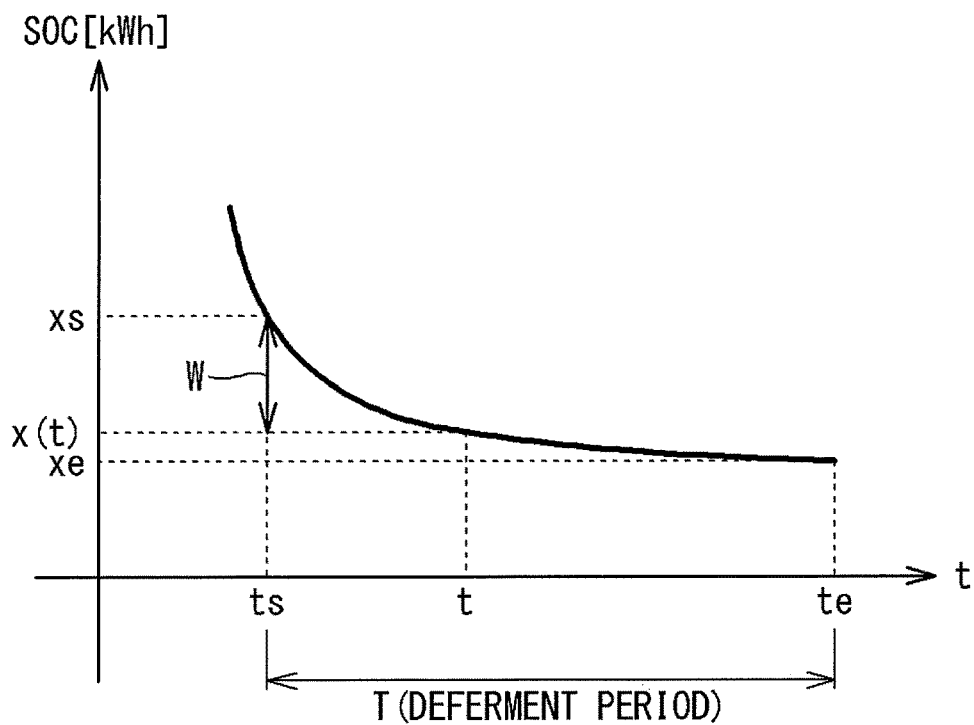

The area (the amount of power) of the right angled triangle having the deferment period T as the base thereof shown in FIG. 7A is equal to the amount of power (=xs−xe) from xe to xs in FIG. 7B. Therefore, the following calculation formula is established.

$$x_s = \frac{1}{2} P_u T \frac{1}{3600} + x_e \qquad \text{[Math. 3]}$$

In the above calculation formula, xe is the minimum SOC (kWh) which is a set value, xs is an SOC (kWh) at which suppression of the upper limit value Pu(t) is started.

Therefore, in actual installation, it is sufficient to start the gradual decrease process in which the upper limit value Pu(t) of the discharge power is caused to gradually decrease in accordance with a lapse of time, when the SOC of the power storage device 6 has become lower than xs.

Pu is a constant that is set. xs is determined by setting xe, and the slope "a" or the deferment period T. Accordingly, an output command value P(t), at a time point of an arbitrary SOC, when the upper limit value Pu(t) is caused to gradually decrease in a linear manner can be obtained.

Specifically, the area (the amount of power) W of the hatched trapezoid portion in FIG. 7A is equal to the amount of power (=xs−x(t)) from x(t) to xs in FIG. 7B. Therefore, if SOC becomes x(t) (<xs) at an arbitrary time point t after ts, the upper limit value Pu(t) after the gradual decrease process can be calculated by the following simultaneous equations.

$$\begin{cases} x_s - x(t) = \left\{ \frac{1}{2} P_u T - \frac{1}{2} P_u(t)(T-t) \right\} \frac{1}{3600} \\ P_u(t) = P_u - aT \end{cases} \qquad \text{[Math. 4]}$$

When the above simultaneous equations are solved for Pu(t), the calculation formula of the upper limit value Pu(t) becomes as follows. It should be noted that the following calculation formula may be expressed by use of a set value P0 and a set value T, instead of the set value xe.

$$Pu(t) = 60\sqrt{2a(x(t)-x_s)} \qquad \text{[Math. 5]}$$

[Error Correction at the Time of Discrete Control in Example 2 of the Method for Calculating Output Command Value]

Figure 8:
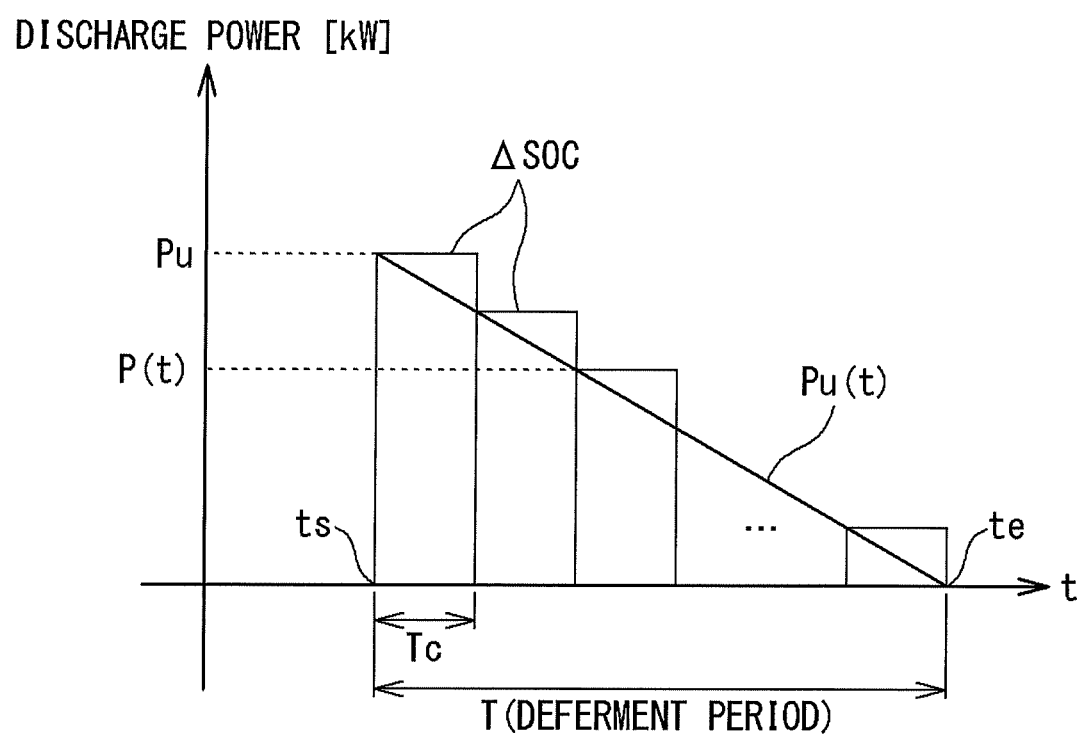
FIG. 8 is a diagram describing an error correction method used when output control value P(t) of a maximum discharge power is obtained through discrete control.
Figure 10A:
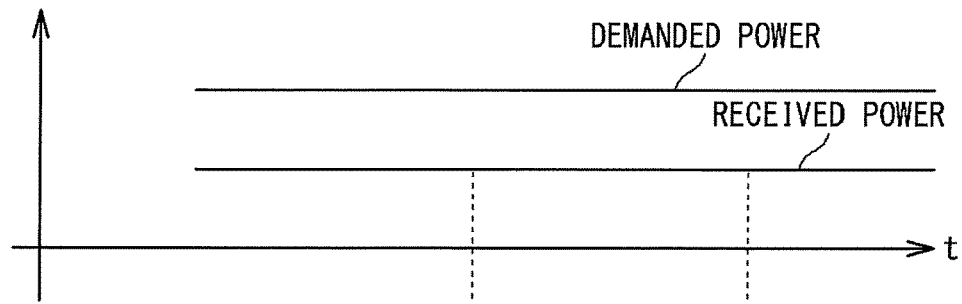
FIG. 10 shows graphs showing temporal change in received power/demanded power (FIG. 10A), discharge power (FIG. 10B) and remaining charged power amount (FIG. 10C) of the power storage device, and generated power (FIG. 10D) of the power generation device, which are obtained when the EMS server performs the output control according to the present embodiment by use of a second deferment period.
Figure 10B:
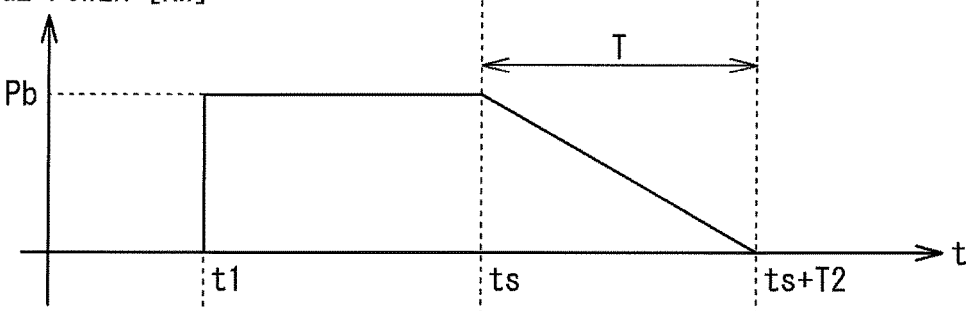
Figure 10C:
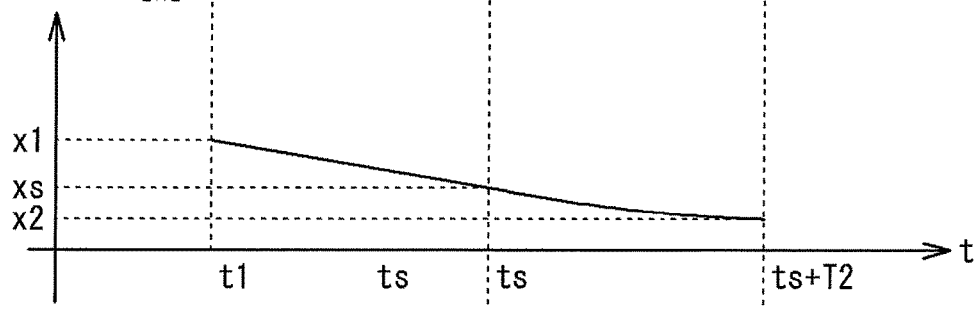
Figure 10D:
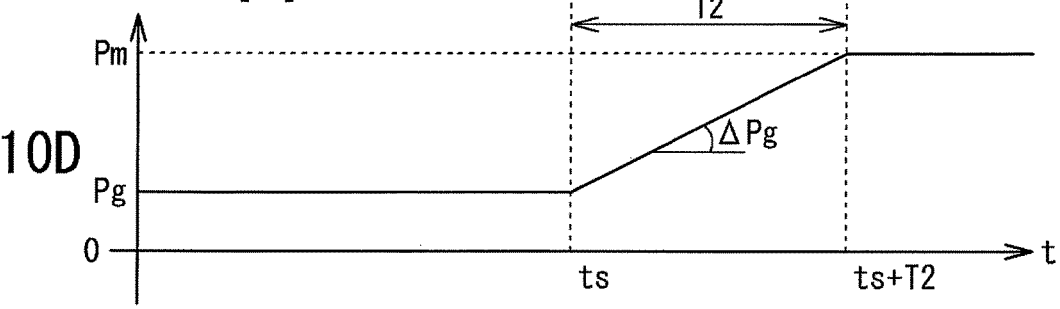
Figure 11A:
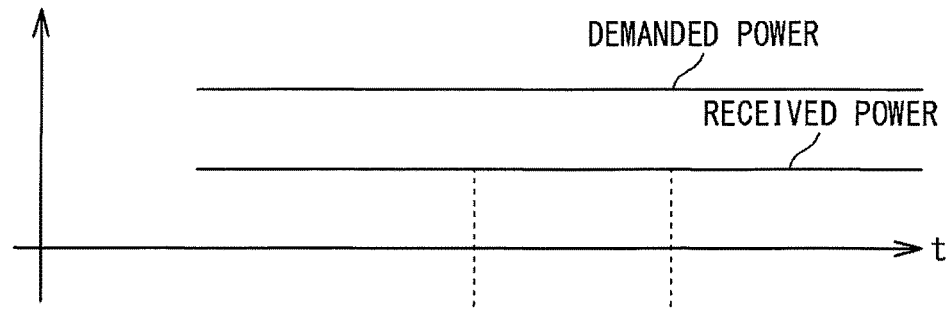
FIG. 11 shows graphs showing temporal change in received power/demanded power (FIG. 11A), discharge power (FIG. 11B) and remaining charged power amount (FIG. 11C) of the power storage device, and generated power (FIG. 11D) of the power generation device, which are obtained when the EMS server performs the output control according to the present embodiment by use of a third deferment period.
Figure 11B:
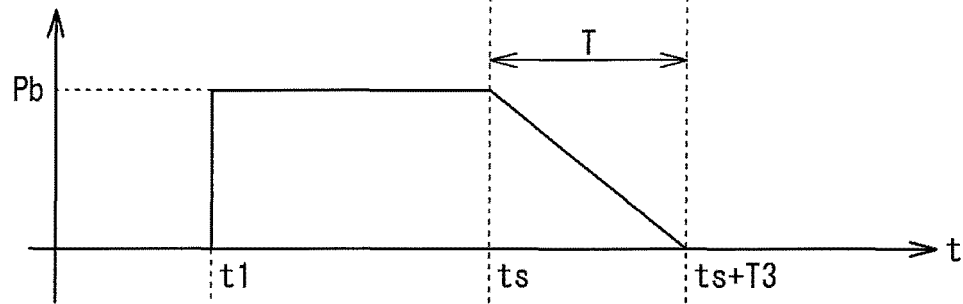
Figure 11C:
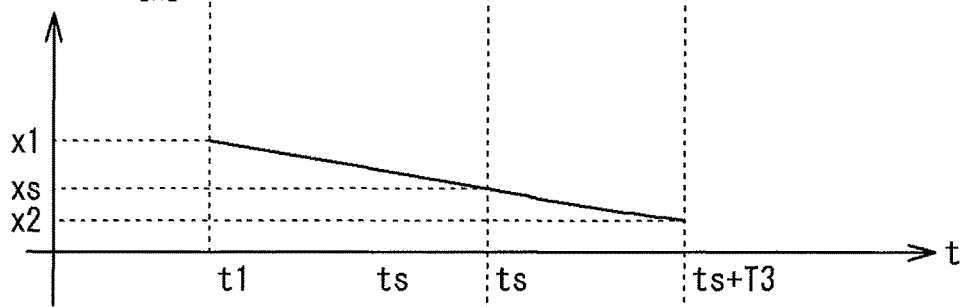
Figure 11D:
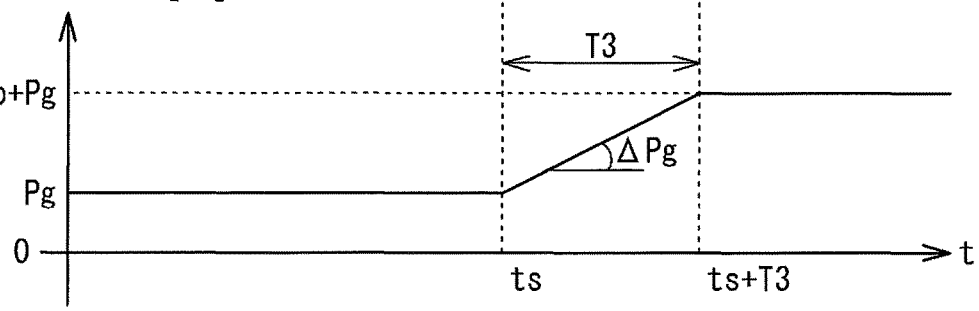

FIG. 8 is a diagram describing an error correction method used when the upper limit value Pu(t) is obtained through discrete control. Here, a case is assumed in which the calculation process of the upper limit value Pu(t) shown in FIG. 7 is discretely performed at a control cycle Tc (seconds) and P(t) is continuously outputted at the upper limit value.

As shown in FIG. 8, the output command value P(t) which proceeds every control cycle Tc forms step-like triangular shapes protruding upward relative to the straight line of Pu(t) which has the slope "a" and which is a continuous value.

An error ΔSOC between the upper limit value Pu(t) and the output command value P(t), the error ΔSOC being generated in association with formation of the protruding triangular shape described above, has a value obtained by the following calculation formula, per step of the control cycle Tc.

$$\Delta SOC = \frac{1}{2} a T_c^2 \frac{1}{3600} \qquad \text{[Math. 6]}$$

For example, in a case where the error amount cannot be ignored because Tc is large, if the error is to be corrected, it is sufficient to calculate an output command value P(t) to be used to suppress the discharge power, by use of the following calculation formula.

$$P(t) = 60\sqrt{2a(x(t)-x_s)} - \frac{1}{2}aT_c \text{ (where } P(t) > 0) \quad \text{[Math. 7]}$$

(where P(t)>0)

[Method for Determining Deferment Period in Example 2 of the Method for Calculating Output Command Value]

In order to suppress variation of received power associated with decrease of the discharge power of the power storage device 6, it is sufficient that the output of the power generation device 5, which is the other device, is increased so as to compensate the output decrease of the power storage device 6 in the deferment period T.

Therefore, it is sufficient that the deferment period T is set to a time period or longer that allows increase of the output from the power generation device 5, by an amount equal to the amount of power outputted by the power storage device 6 after the present time point. Specifically, the deferment period T may be determined as follows.

That is, output control of the power storage device 6 according to the present embodiment is characterized in that the maximum discharge power Pu(t) of the power storage device 6 is caused to gradually decrease over the deferment period T, and output from the power generation device 5 is increased during the deferment period T. Thus, it is sufficient that the following two parameters relating to output change of the power generation device are taken into consideration.

1) state shift time period tg of the power generation device 5

2) output increase speed ΔPg of the power generation device 5

Here, if ΔPg is assumed to be constant, it is sufficient that T is dynamically or statically determined so as to satisfy the following relational expression (inequality).

$$T > t_g + \frac{P_u}{2 \cdot \Delta P_g} + \sqrt{\frac{t_g \cdot P_u}{\Delta P_g} + \left(\frac{P_u}{2 \cdot \Delta P_g}\right)^2} \quad \text{[Math. 8]}$$

At this time, the elements 1) and 2) may be statically determined by being assumed in advance.

For example, with respect to the parameters 1) and 2), if the state of the power generation device 5 has already shifted, tg=0 is established, and thus, it is sufficient to employ, as the deferment period T for ΔPg, an arbitrary time value that satisfies T>Pu/ΔPg.

[Operation Example when First Deferment Period is Used]

FIG. 9 shows graphs indicating temporal change in received power/demanded power (FIG. 9A), discharge power (FIG. 9B) and remaining charged power amount (FIG. 9C) of the power storage device, and generated power (FIG. 9D) of the power generation device, which are obtained when the EMS server 1 performs the output control according to the present embodiment by use of a first deferment period T1.

In FIG. 9, "Pm" is the maximum output of the power generation device 5, and "T1" is a time period in which the output of the power generation device 5 reaches, starting from 0, the maximum output Pm (hereinafter, referred to as "first deferment period").

In this case, if it is assumed that the power generation device 5 needs the state shift time period tg in order to start outputting, the first deferment period T1 can be calculated by the following formula:

$$T1 = tg + tv1 + tv2$$

where tv1 is a time period in which the output of the power generation device 5 increases at a first increase speed ΔPg1, and tv2 is a time period in which the output of the power generation device 5 increases at a second increase speed ΔPg2 (<ΔPg1).

As shown in FIG. 9, in a case where the output of the power generation device 5 is zero at the start time point is of the gradual decrease process, and the output variation at the time of start of operation of the power generation device 5 is as described above, it is sufficient that the deferment period T in which the upper limit value Pu(t) of the power storage device 6 is caused to gradually decrease from Pu to zero is set to a time period (=the first deferment period T1) in which the output of the power generation device 5 reaches, starting from 0, the maximum output Pm.

[Operation Example when Second Deferment Period is Used]

FIG. 10 shows graphs indicating temporal change in received power/demanded power (FIG. 10A), discharge power (FIG. 10B) and remaining charged power amount (FIG. 10C) of the power storage device, and generated power (FIG. 10D) of the power generation device, which are obtained when the EMS server 1 performs the output control according to the present embodiment by use of a second deferment period T2.

In FIG. 10, "Pm" is the maximum output of the power generation device 5, "Pg" is the steady output of the power generation device 5 before the gradual decrease process is started, and "T2" is a time period in which the output of the power generation device 5 reaches, starting from the steady output Pg, the maximum output Pm (hereinafter, referred to as "second deferment period").

In this case, the second deferment period T2 can be calculated by the following formula:

$$T2 = (Pm - Pg)/\Delta Pg$$

where ΔPg is the output increase speed of the power generation device 5.

As shown in FIG. 10, in a case where the output of the power generation device 5 is the steady output Pg at the start time point is of the gradual decrease process, it is sufficient that the deferment period T in which the upper limit value Pu(t) of the power storage device 6 is caused to gradually decrease from Pu to zero is set to a time period (=the second deferment period T2) in which the output of the power generation device 5 reaches, starting from the steady output Pg, the maximum output Pm.

[Operation Example when Third Deferment Period is Used]

FIG. 11 shows graphs indicating temporal change in received power/demanded power (FIG. 11A), discharge power (FIG. 11B) and remaining charged power amount (FIG. 11C) of the power storage device, and generated power (FIG. 11D) of the power generation device, which are obtained when the EMS server 1 performs the output control according to the present embodiment by use of a third deferment period T3.

In FIG. 11, "Pg" is the steady output of the power generation device 5 before the gradual decrease process is started, and "T3" is a time period in which the output of the power generation device 5 increases by the upper limit value Pu of the power storage device 6 (hereinafter, referred to as "third deferment period").

In this case, the third deferment period T3 can be calculated by the following formula:

$$T3 = Pu/\Delta Pg$$

where $\Delta Pg$ is the output increase speed of the power generation device 5.

As shown in FIG. 11, in a case where the output of the power generation device 5 is the steady output Pg at the start time point is of the gradual decrease process, it is sufficient that the deferment period T in which the discharge power of the power storage device 6 is caused to gradually decrease from Pu to zero is set to a time period (=the third deferment period T3) in which the output of the power generation device 5 increases by the upper limit value Pu of the power storage device 6.

[Other Modifications]

The embodiments disclosed herein are merely illustrative in all aspects and should not be recognized as being restrictive. The scope of the present invention is defined by the scope of the claims, and is intended to include meaning equivalent to the scope of the claims and all modifications within the scope.

In the embodiment described above, a gradual decrease process (hereinafter, referred to as "first gradual decrease process") in which, when the remaining charged power amount is not less than the lower limit value x2 of the operation range, the maximum discharge power Pu of the power storage device 6 is caused to gradually decrease over a predetermined deferment period T has been shown as an example. However, a similar gradual decrease process may be performed for a maximum charge power Pu'.

That is, the control section 11 of the EMS server 1 may perform a gradual decrease process (hereinafter, referred to as "second gradual decrease process") in which, when the remaining charged power amount is not greater than the upper limit value x1 of the operation range, the maximum charge power Pu' of the power storage device 6 is caused to gradually decrease over a predetermined deferment period T.

Specifically, the above second gradual decrease process is output control which causes, in a case where the power storage device 6 is in charge, the output command value P(t) for the power storage device 6 to gradually decrease such that the charge power smoothly converges "over a predetermined deferment period".

It should be noted that "to converge over a predetermined deferment period" includes not only a case where the charge power becomes zero at the end time point of the deferment period, but also a case where the charge power becomes zero at a time point slightly after the end time point of the deferment period.

In this case, when charging of the power storage device 6 is to be ended, it is possible to prevent in advance a situation in which the charge power instantaneously decreases from the maximum charge power value Pu', which set to be constant, to zero.

It should be noted that the control section 11 may perform both the first and second gradual decrease processes described above, or may perform only one of the first and second gradual decrease processes.

In the embodiment described above, an example case has been shown in which the discharge power (alternatively, the charge power) is caused to gradually decrease in an exponential or linear manner over a predetermined deferment period T. However, the time function regarding the deferment period T in which the discharge power (alternatively, the charge power) is caused to gradually decrease is not limited to an exponential function or a linear function.

For example, the time function described above may be a high-order function, a logarithmic function, or the like, or may be a function obtained by combining at least two of the already-described functions (exponential function, linear function, high-order function, and logarithmic function).

In the embodiment described above, an example case has been shown in which the load device 4, the power generation device 5, and the power storage device 6 are included in the power equipment 2 which is managed by the EMS server 1. However, it is sufficient that the power equipment 2 includes: at least one power storage device 6 for which the output control according to the present embodiment is performed; and a power device (any of the load device 4, the power generation device 5, and the power storage device 6) other than the at least one power storage device 6.

In the embodiment described above, an example case has been shown in which the output control, for the power storage device 6, including the process of setting the operation range for the remaining charged power amount and the gradual decrease process for the discharge power is performed by the EMS server 1. However, the output control may be performed by a controller (computer device) of the power storage device 6.

That is, the output control described above may be performed by the EMS server 1 or by the power storage device 6.

In the embodiment described above, an FEMS including the EMS server 1 and the power equipment 2 has been shown as an example. However, the output control according to the present embodiment can be employed for an HEMS (home energy management system), a BEMS (building energy management system), an MEMS (mansion energy management system), or the like.

REFERENCE SIGNS LIST

1 EMS server
2 power equipment
3 distribution line
4 load device
5 power generation device
6 power storage device
7 commercial power source
8 communication line
11 control section
12 storage section
13 communication section

The invention claimed is:

1. An output control device, for a power storage device, configured to control an output of the power storage device that is chargeable and dischargeable, the output control device comprising:

an obtainment section configured to obtain a remaining charged power amount at a present time point of the power storage device; and a control section configured to set an operation range of the remaining charged power amount of the power storage device, wherein the control section performs a gradual decrease process in which, when a power generation device is in an operable state or an operating state and the obtained remaining charged power amount reaches a predetermined initial value within the operation range while the power storage device is in discharge, a maximum discharge power of the power storage device is caused to gradually decrease over a predetermined deferment period.

2. The output control device for the power storage device according to claim 1, wherein
the deferment period is a time period in which an output of the power generation device reaches a maximum output, from 0.

3. The output control device for the power storage device according to claim 1, wherein
the deferment period is a time period in which an output of the power generation device reaches a maximum output, from a steady output thereof.

4. The output control device for the power storage device according to claim 1, wherein
the deferment period is a time period in which an output of the power generation device increases by a steady output of the power storage device.

5. The output control device for the power storage device according to claim 1, wherein
the gradual decrease process is a process in which the maximum discharge power is caused to gradually decrease in an exponential manner in accordance with a lapse of time.

6. The output control device for the power storage device according to claim 1, wherein
the gradual decrease process is a process in which the maximum discharge power is caused to gradually decrease in a linear manner in accordance with a lapse of time.

7. A power system comprising:
power equipment including a power storage device that is chargeable and dischargeable, and another power device to be subjected to power control;
an EMS (energy management system) server capable of controlling power demand and supply in the power equipment, wherein
the power storage device or the EMS server is provided with the output control device according to claim 1.

8. The output control device for the power storage device according to claim 1, wherein the control section gradually decreases the maximum discharge power by an output of the power generation device that can increase during the predetermined deferment period.

9. The output control device for the power storage device according to claim 1, wherein a slope of the gradually decreasing amount of the maximum discharge power is equal to a response speed of the power generation device.

10. A non-transitory computer readable storage medium storing a computer program configured to cause a computer to perform a process for controlling an output of a power storage device that is chargeable and dischargeable, the process comprising:
an obtainment process in which a remaining charged power amount at a present time point of the power storage device is obtained;
a setting process in which an operation range of the remaining charged power amount of the power storage device is set; and
a gradual decrease process in which, when a power generation device is in an operable state or an operating state and the obtained remaining charged power amount reaches a predetermined initial value within the operation range while the power storage device is in discharge, a maximum discharge power of the power storage device is caused to gradually decrease over a predetermined deferment period.

11. The non-transitory computer readable storage medium according to claim 10, wherein in the gradual decrease processes, the maximum discharge power is gradually decreased by an output of the power generation device that can increase during the predetermined deferment period.

12. The non-transitory computer readable storage medium according to claim 10, wherein a slope of the gradually decreasing amount of the maximum discharge power is equal to a response speed of the power generation device.

13. An output control method for controlling an output of a power storage device that is chargeable and dischargeable, the method comprising:
a step of obtaining a remaining charged power amount at a present time point of the power storage device;
a step of setting an operation range of the remaining charged power amount of the power storage device; and
a step of performing
a gradual decrease process in which, when a power generation device is in an operable state or an operating state and the obtained remaining charged power amount reaches a predetermined initial value within the operation range while the power storage device is in discharge, a maximum discharge power of the power storage device is caused to gradually decrease over a predetermined deferment period.

14. The output control method according to claim 13, wherein in the gradual decrease processes, the maximum discharge power is gradually decreased by an output of the power generation device that can increase during the predetermined deferment period.

15. The output control method according to claim 13, wherein a slope of the gradually decreasing amount of the maximum discharge power is equal to a response speed of the power generation device.

* * * * *